United States Patent [19]

Petkov et al.

[11] Patent Number: 4,573,841
[45] Date of Patent: Mar. 4, 1986

[54] METHOD OF AND APPARATUS FOR THE FINISH SHAPING OF PROFILED CYLINDRICAL HOLES

[75] Inventors: Georgi K. Petkov; Nikola M. Netzov; Botyo P. Botev; Dimiter N. Bankovski, all of Gabrovo, Bulgaria

[73] Assignee: N P S P po Hydroplastichna Obrabotka na Metalite, Gabrovo, Bulgaria

[21] Appl. No.: 551,716

[22] Filed: Nov. 15, 1983

[30] Foreign Application Priority Data

Dec. 22, 1982 [BG] Bulgaria .................................. 58988

[51] Int. Cl.⁴ ...................... B23D 37/00; B23D 43/02
[52] U.S. Cl. .................................... 409/244; 29/90 R; 72/325; 72/370; 407/13; 409/249; 409/281
[58] Field of Search ............... 409/244, 249, 253, 280, 409/281, 283, 287; 407/13, 16; 72/62, 58, 325, 370; 29/90 R, 90, 90 B

[56] References Cited

U.S. PATENT DOCUMENTS

| | | | |
|---|---|---|---|
| 1,930,745 | 10/1933 | Fisher | 72/62 |
| 3,715,901 | 2/1973 | Couland | 72/62 |
| 3,795,957 | 3/1974 | Steusloff | 29/90 R |
| 4,012,829 | 3/1977 | Dvorov et al. | 407/13 |
| 4,111,586 | 9/1978 | Bistrick et al. | 407/16 |
| 4,133,089 | 1/1979 | Heymanns | 29/90 R |
| 4,393,675 | 7/1983 | Azarevich | 29/90 R X |
| 4,502,308 | 3/1983 | Kelly | 72/370 X |

FOREIGN PATENT DOCUMENTS

| | | | |
|---|---|---|---|
| 3238964 | 4/1984 | Fed. Rep. of Germany | 409/249 |
| 1367980 | 9/1974 | United Kingdom | 407/16 |
| 250639 | 8/1969 | U.S.S.R. | 72/370 |
| 639667 | 2/1979 | U.S.S.R. | 29/90 R |
| 0732092 | 5/1980 | U.S.S.R. | 409/249 |
| 753562 | 8/1980 | U.S.S.R. | 29/90 R |
| 0917973 | 4/1982 | U.S.S.R. | 409/249 |
| 0933309 | 6/1982 | U.S.S.R. | 409/287 |

Primary Examiner—Gil Weidenfeld
Assistant Examiner—Glenn L. Webb

[57] ABSTRACT

Method of and tool for the precise and finish processing of profiled cylindrical holes in a metal workpiece, wherein the length to billet diameter ratio of the hole is larger than 3. In accordance with the method of the invention, there is preliminary chip removal along the hole being processed, and the hole is later plastically deformed by fluid fed to the deformation zone thereof under high pressure. Fluid under high pressure is also fed to the zone of chip removal and is directed toward the chips removed from the material.

The tool for carrying out the method comprises guiding, cutting, deforming and sizing parts disposed in such sequence and mounted upon a tool body. The tool body is provided with a blind axial hole through which the fluid under high pressure is supplied to the deformation zone of the hole in the workpiece and to the zone of chip removal where it is directed toward the chips removed from the material of the workpiece.

8 Claims, 6 Drawing Figures

METHOD OF AND APPARATUS FOR THE FINISH SHAPING OF PROFILED CYLINDRICAL HOLES

This invention relates to a method of and an apparatus for the precise finish processing of profiled cylindrical holes. The invention is applicable to metal working, and is particularly adapted for the processing of holes having a ratio of length (L) to diameter (D) greater than 3 (L/D>3).

The publication "Engineering Technology", by P. Patarinski, published 1975, describes a method for the precise processing of profiled and cylindrical holes by chip removal along the length of the hole being processed, such method involving drawing, broaching, and other operations. A disadvantage of such known method is its limited process capabilities because of the difficult chip disposal and cooling of the tool.

Author's Certificate No. 21 914 of the Peoples Republic of Bulgaria describes a method for the finishing of profiled cylindrical holes with a ratio of the length (L) of the processed hole to the diameter (D) of the hole larger than 3 (L/D>3) by feeding a fluid under pressure into the deformation zone. A disadvantage of this method is the need for the precise preprocessing and subsequent finishing when the hole to be processed is disposed in billets having metalurgical defects. Still another disadvantage is the inapplicability of the method for the processing of holes of an irregular profile near the outer surface of a billet, such irregularity resulting from the uneven residual deformation of the billet along the hole.

A publication, "Metal Cutting Tools" by P. Sabchev, published 1964, page 62, describes a combined cutting-deforming tool used for the same purpose. Such tool comprises a body with guiding, cutting, deforming and sizing parts disposed in sequence. The disadvantage of such known tool is that its elements are worn out quite rapidly because of the arduous conditions under which they operate, such conditions being caused by inefficient lubrication and cooling, and the difficulties of removing chips from the cutting zone.

The present invention has among its objects the development of a method for the precise and finish processing of profiled cylindrical holes and a tool for performing such method. Such tool chip removal and deformation of the workpiece or billet are carried out on one and the same fixture with one or several runs or passes of the tool through the hole being processed. The wear resistance of the tool is improved and the disposal of chips from the cutting zone is guaranteed with improved lubrication and cooling of the tool the result of which is a reduction of the cutting forces required.

In accordance with the method of the invention, there is a preliminary chip removal along the hole being processed, and later such hole is plastically deformed by fluid introduced under high pressure into the deformation zone. Moreover, in the zone of chip removal a fluid under pressure is also fed at a high rate, such fluid being directed toward the chips removed from the billet or workpiece.

The tool of the invention comprises guiding, cutting, deforming and sizing parts disposed in that sequence; in the body of the tool there is drilled a blind axial hole connected with a first row of radial grooves in the deforming part and a second row of radial grooves connecting the axial hole with the cutting part of the tool through throttle holes. It is preferred that the tool be provided with at least two rows of cutting elements, and that the throttle holes are formed in the rake of the cutting element which is located in the deforming part of the tool.

In order to facilitate the manufacture of the tool, the cutting part thereof can be made of a prefabricated design comprising front and back sleeves which are telescoped over the tool body, and a cutting rim. There is the possibility of making the throttle holes before assembly of the parts in the form of open grooves along the front surface of the back sleeve. Beside that, along the face surface and along the inner diameter of the back sleeve a by-pass channel is formed, such channel being connected to the second row of radial grooves. Such construction favors the uniform feeding of fluid to the throttle holes.

The first row of the cutting elements is disposed on a member in the form of a whole rim; in contrast thereto, the second row of cutting elements (on the front sleeve) is in the form of teeth disposed symmetrically with respect to the throttle holes. The teeth are provided with a side clearance angle $\gamma$ (gamma), such angle preferably having a value of from 3° to 15°.

The front guiding portion of the tool is also made as a separate sleeve which is telescoped over the body of the tool and pressed toward the front sleeve of the cutting portion by a nut secured by a lock nut. The cutting rim, the deforming part and the rear guiding part can also be made in the form of sleeves mounted on the tool body.

The advantage of the method of the invention is the widening of the capabilities of the process—holes with the ratio of the hole length L—holes with the ratio of the hole length L and diameter D larger than 3 (L/D>3) are processed, since the invention solves the problem of breaking the chips and disposing of them, and also the cooling of the tool. The method is also applicable to the processing of holes with uneven profiles, so that the necessity for the preprocessings of the holes prior to finishing is rather limited. The advantage of the tool is its improved life resulting from the favorable conditions under which it is used, that is, its effective lubrication and the dissipation of heat from it.

Reference will now be made by way of example to the accompanying drawings, wherein.

Figure 1:
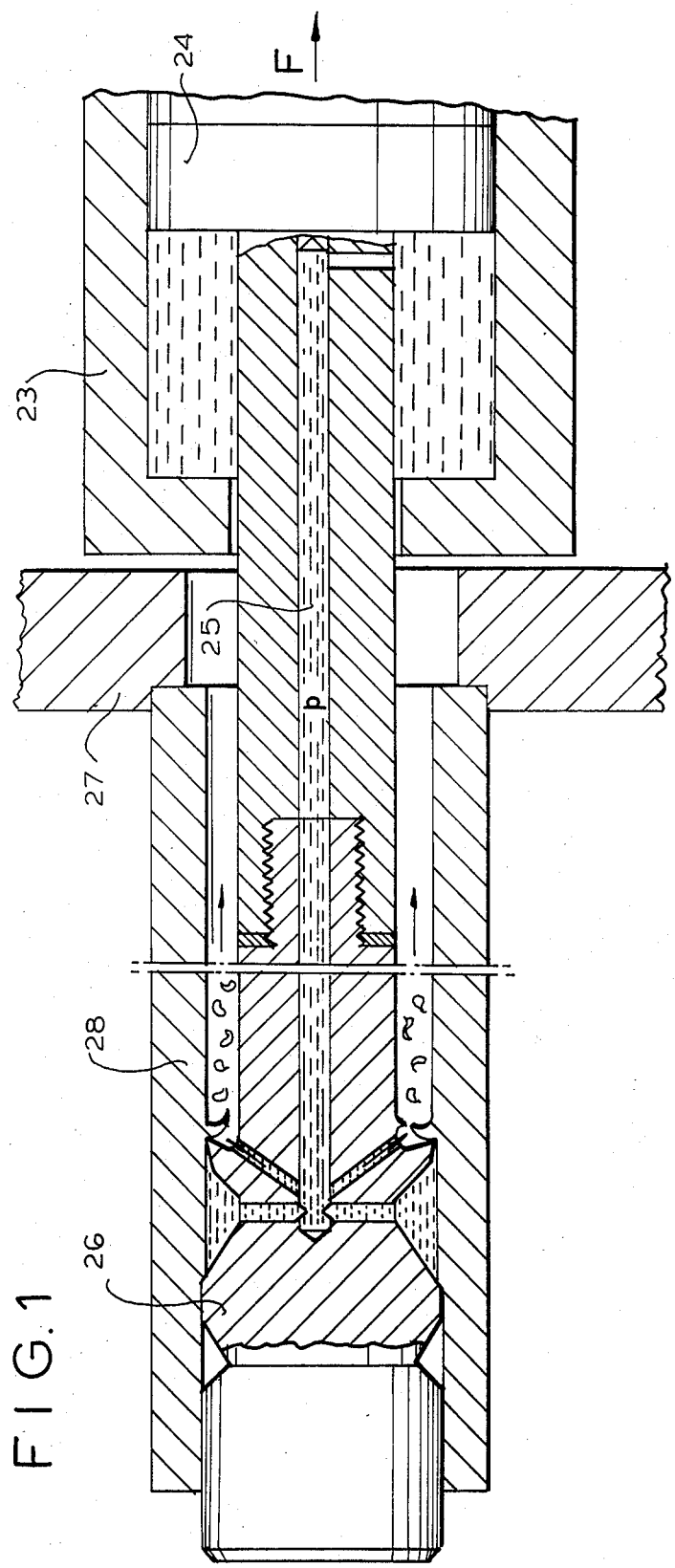
FIG. 1 is a view partially in side elevation and partially in longitudinal axial section through a first embodiment of the tool of the invention.
Figure 2:
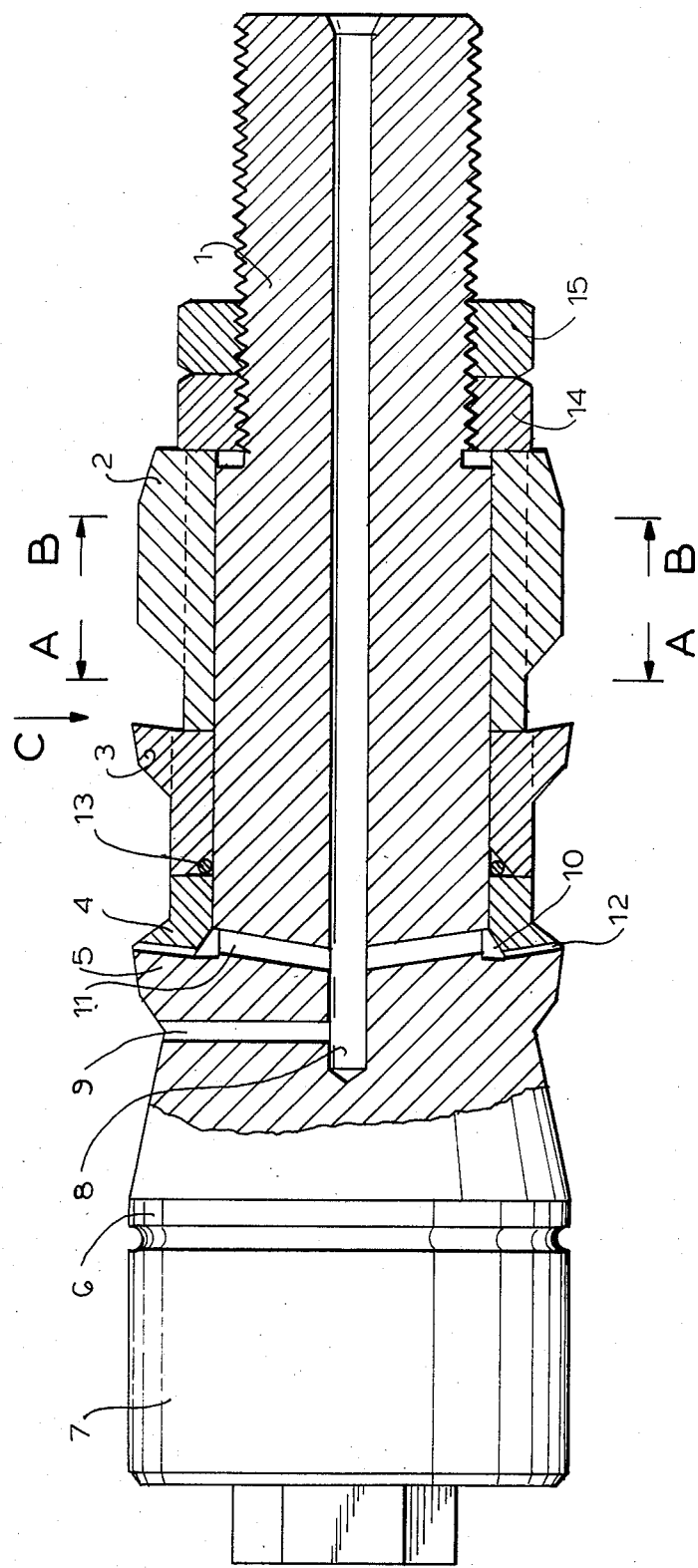
FIG. 2 is a view in plan of a tooth of the tool, the view being taken in the direction of the arrow C in FIG. 1.
Figure 4:
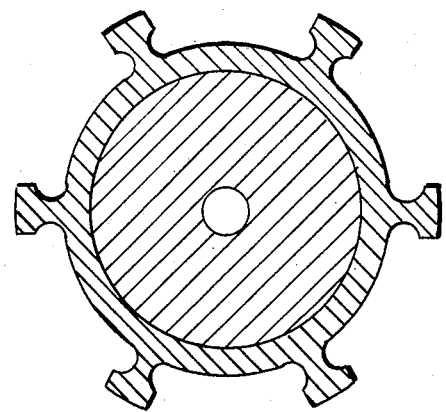
FIG. 4 is a view in cross-section through the tool, the section being taken along the line 4—4 in FIG. 1 in the direction of the arrows.

Turning first to FIGS. 1-4, incl., which illustrate the first preferred embodiment of the tool of the invention, there is shown an elongated tool with a body 1 on which there are disposed in sequence in the direction from right (front) to left (back) a front guiding part 2 having a rear sleeve portion 2', a prefabricated cutting part 3 bearing a plurality of teeth 16 spaced uniformly angularly thereabout, a back sleeve 4, a cutting ring 5, a deforming part 6, and a back guiding part 7. In the body 1 of the tool there is drilled a blind axial hole 8, hole 8 being connected through a first, back row of radial passages 9 with the forward portion deforming part 6 and the back surface of cutting rim 5. Back sleeve 4 is provided with a chamfer along the inner diameter whereby to form a by-pass channel 10, channel 10 being connected to the blind axial hole 8 by radial passages 11 and to throttle holes 12, as shown. Throttle holes 12 are formed along the face surface of back sleeve 4 and can be processed as open holes prior to the assembly of the front sleeve 3 and the back sleeve 4 upon the body 1.

As shown in FIG. 1, the righthand end of body 1 of the tool is threaded. The sleeves 2, 2', 3, and 4 are strongly thrust to the left by a nut 14 screwed upon the body 1, such nut 14 being locked in place by a lock nut 15. The forward end of the sleeve 3 is chamfered, as shown, and a sealing O ring 13 is disposed in the space provided between the rear end surface of the back sleeve 4, the chamfered forward surface of the sleeve 3, and the outer peripheral surface of the body 1 of the tool at such location.

Figure 3:
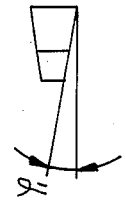
FIG. 3 is a view in cross-section through the tool taken along the line 3—3 in FIG. 1 in the direction of the arrows.

The back sleeve 4 and the cutting rim 5 formed integrally with the body 1 of the tool together form a composite cutting part which is shown more clearly in FIG. 3. The first cutting element is formed on the front sleeve 3 and has teeth 16 (FIG. 3) having a side clearance angle $\phi$ ranging from 3° to 15°, and the second cutting element is the hole cutting rim 5 of body 1.

Figure 5:
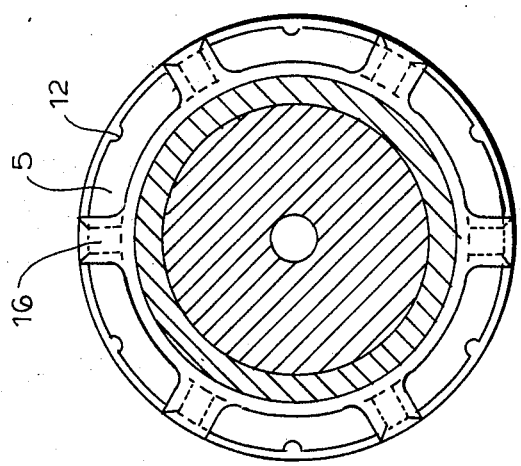
FIG. 5 is a view partially in side elevation and partially in axial section through schematically shown apparatus including the tool of FIGS. 1-4, incl., for performing the method of the invention.

In FIG. 5 there is schematically shown apparatus for carrying out the method of the invention. Such apparatus includes a hydraulic cylinder 23 having a piston 24 therein, piston 24 having an axial hole 25 therein and a counterbore at its forward, left end receiving the righthand end of the body 1 of the tool 1 of FIGS. 1-4, inclusive. A rigid unyielding fixed stop 27 is provided to prevent the travel to the right of a billet 28 which is to be processed.

The tool operates as follows: Tool 26 is introduced into the lefthand end of the hole in billet 28, and when force F is applied on the hydraulic cylinder 23 its chamber is filled with fluid under pressure, the piston 24, the piston rod, and the tool connected thereto then being thrust to the right. Such pressure is also fed through hole 25 in the piston to the tool 26 and hence through the first row of radial grooves 9 disposed in front of the deforming part 6 of the tool, and through the second row of radial passages 11 and the throttle holes 12 toward the cutting zone. Under the action of the fluid fed at a high rate, chips removed from the material of the billet are broken up and disposed of through the axial hole in the tool and the axial hole in the piston.

Figure 6:
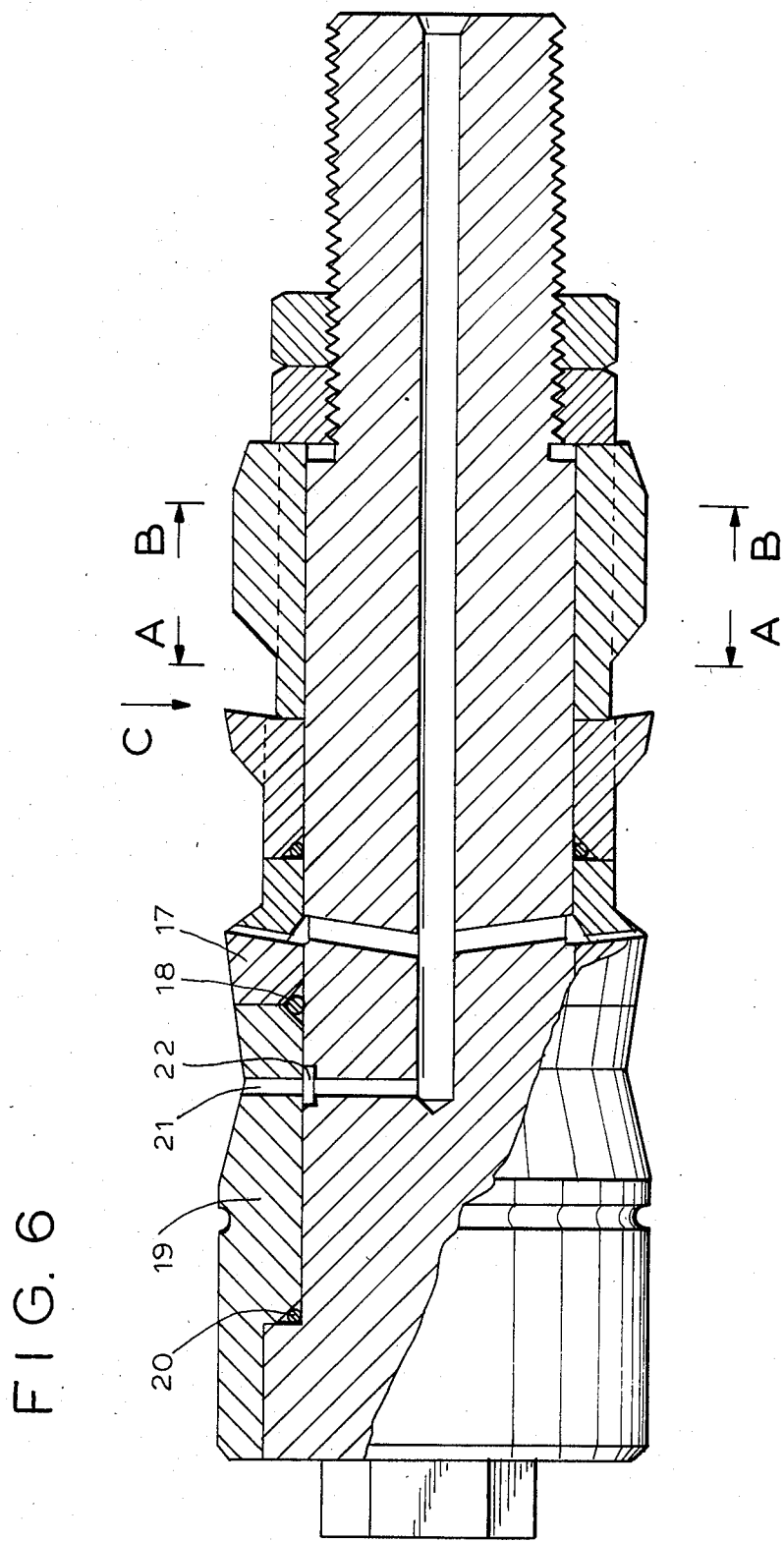
FIG. 6 is a view similar to FIG. 1 of a second embodiment of the tool of the invention.

In FIG. 6 there is shown a second embodiment of tool in accordance with the invention. Parts in FIG. 6 which are similar to those in FIGS. 1-5, incl., are designated by the same reference characters as those employed in the first embodiment. In the embodiment of FIG. 6, the cutting rim 5 is made as a separate sleeve 17, mounted and gasketed on the body 1 by means of an O ring 8. The deforming part 6 and the back guiding part 7 are made as one sleeve 19, sleeve 19 being mounted and sealed on body 1 by means of an O ring 20. In the sleeve 19 there are formed radial holes 21 which are connected with a first row of radial channels 9 through a by-pass channel 22 provided in the body 1 of the tool.

In yet another, unillustrated embodiment of the invention, the entire tool and the parts thereof shown in the embodiment of either FIG. 1 or FIG. 6 can be made in one piece. It is also to be understood that beside the mounting of the tool as shown in FIG. 5 wherein it is drawn by the piston 24 in a direction from left to right, the tool could be operated by thrusting it from left to right by an axial force applied to its lefthand end, fluid under pressure being supplied to the axial bore in the body 1 of the tool in the direction from the righthand end of the tool inwardly thereof.

In laboratory tests made on a broaching machine 7 B 57 the method of the invention was applied for the processing of billets made of 40×steel of 32 mm diameter and 260 mm length, at a rate of 2 m/min. The results obtained are set forth in the Table below.

TABLE

| No. | Length | Diameter of hole processed (mm) | Axial Force in Newtons (N) × 10⁴ | Pressure of lubricant (bars) | Remarks |
|---|---|---|---|---|---|
| 1 | 260 | 32.4 | 3.5 | 283 | wrinkling along the helical line |
| 2 | 260 | 32.4 | 10 | 283 | breaking of draw bar |
| 3 | 260 | 32.3 | 2.5 | 202 | wrinkling along the helical line |
| 4 | 260 | 32.3 | 4 | 323 | wrinkling along the helical line |
| 5 | 260 | 32.38 | 3.1 | 251 | no traces in the hole |
| 6 | 260 | 32.37 | 3 | 243 | no traces in the hole |
| 7 | 260 | 32.38 | 3 | 243 | no traces in the hole |

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A method for the precise and finish processing of a profiled cylindrical hole in a workpiece, comprising first removing chips along the hole being processed and during the removal of the chips along the hole subjecting the machined zone of the hole to plastic deformation by feeding fluid under high pressure and at a high speed into the deformation zone, whereby the fluid also removes the chips from the machined deformation zone.

2. A tool for the precise and finished processing of a profiled cylindrical hole in a workpiece, comprising a tool provided with a guiding, cutting and deforming parts disposed in such sequence, the body of the tool having a blind axial hole therein, said axial hole being connected through a first row of radial passages to the deforming part of the tool and through a second row of radial passages to the cutting part of the tool, said cutting part of the tool having at least two rows of cutting elements including a first row and a second row thereof and a cutting rim, in the front part of said cutting rim there being provided throttle holes connected to the second row of radial passages through a by-pass channel, and means for feeding fluid under high pressure and at a high speed into the blind axial hole in the tool and thence radially outwardly through the first row of radial passages to the deforming part of the tool, whereby the fluid subjects the machined zone of the hole in the workpiece to plastic deformation and also removes the chips from the machined deformation zone.

3. A tool according to claim 2, wherein the cutting part is a composite piece made up of said cutting rim and front and back sleeves which are telescoped over and sealed to the body of the tool, and the throttle holes are formed along the front surface of said back sleeve as open grooves.

4. A tool in accordance with claim 2, wherein the cutting rim is made as a prefabricated sleeve which is telescoped over the tool body and sealed thereto by a gasket.

5. A tool in accordance with claim 2, wherein the deforming and the back guiding parts of the tool are made as one prefabricated sleeve mounted on the body of the tool and sealed thereto by a gasket.

6. A tool in accordance with claim 2, wherein the back sleeve is chamferred along the inner diameter of its front surface thus forming the by-pass channel.

7. A tool in accordance with claim 2, wherein the first row of cutting elements is an entire rim, and the second row of cutting elements has teeth thereon with a side clearance angle ranging between 3° and 15°.

8. Apparatus for the precise and finish processing of a profiled cylindrical hole in a workpiece, comprising means for first removing chips along the hole being processed, and means acting during the removable of the chips along the hole plus subjecting the machined zone of the hole to plastic deformation by feeding fluid under high pressure and at a high speed into the deformation zone, whereby the fluid also removes the chips from the machined deformation zone.

* * * * *